(12) United States Patent
U et al.

(10) Patent No.: US 12,319,799 B2
(45) Date of Patent: Jun. 3, 2025

(54) POLYMERIZATION METHODS FOR MEMBRANE FORMATION

(71) Applicant: Gradiant Corporation, Woburn, MA (US)

(72) Inventors: Aaron Jit Loong U, Singapore (SG); Bolian Berlin Ng, Singapore (SG); Kangjia Lu, Singapore (SG)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 18/415,450

(22) Filed: Jan. 17, 2024

(65) Prior Publication Data

US 2025/0075043 A1    Mar. 6, 2025

Related U.S. Application Data (60) Provisional application No. 63/579,279, filed on Aug. 28, 2023.

(51) Int. Cl.
| | | |
|---|---|---|
| *C08J 5/18* | (2006.01) | |
| *B01D 61/14* | (2006.01) | |
| *B01D 67/00* | (2006.01) | |
| *B01D 71/68* | (2006.01) | |
| *C08J 9/28* | (2006.01) | |

(52) U.S. Cl.
CPC .............. *C08J 5/18* (2013.01); *B01D 61/145* (2013.01); *B01D 67/0006* (2013.01); *B01D 71/68* (2013.01); *C08J 9/286* (2013.01); *C08J 2377/00* (2013.01)

(58) Field of Classification Search
CPC .......... C08J 5/18; C08J 9/286; C08J 2377/00; B01D 71/68; B01D 67/0006; B01D 61/145
USPC ......................................................... 521/64
See application file for complete search history.

(56) References Cited

U.S. PATENT DOCUMENTS

| | | | |
|---|---|---|---|
| 4,075,253 A | 2/1978 | Horiie et al. | |
| 4,529,646 A | 7/1985 | Sundet | |
| 11,534,719 B1 * | 12/2022 | Lokare | C02F 1/441 |
| 2011/0189469 A1 | 8/2011 | Stenzel et al. | |
| 2020/0181426 A1 * | 6/2020 | Cao | A61K 39/39 |
| 2022/0088544 A1 | 3/2022 | Wang et al. | |
| 2022/0380233 A1 * | 12/2022 | Stover | C02F 1/441 |
| 2024/0109037 A1 * | 4/2024 | Lokare | C02F 1/441 |

OTHER PUBLICATIONS

Li et al. "Can the NF membrane directly obtained by the interfacial polymerization of MPD and TMC?", Journal of Membrane Science, 656 (2022), 120618 (Year: 2022).*
Li et al., Can the NF membrane directly obtained by the interfacial polymerization of MPD and TMC?. J Membr Sci. Aug. 15, 2022;656:120618.
Li et al., Can the NF membrane directly obtained by the interfacial polymerization of MPD and TMC?. J Membr Sci. Aug. 15, 2022;656:120618. Supplementary Materials.
International Search Report and Written Opinion for International Application No. PCT/US2024/044090 dated Nov. 6, 2024.

* cited by examiner

*Primary Examiner* — Michael M. Bernshteyn
(74) *Attorney, Agent, or Firm* — Wolf, Greenfield & Sacks, P.C.

(57) ABSTRACT

Methods of forming porous media (e.g., membranes for liquid separations or parts thereof) via polymerization, and related articles, are generally described. In some instances, two components are combined such that a polymerization (e.g., interfacial polymerization) reaction occurs, resulting in the formation of polymer layer (e.g., an active layer). In some instances, the two components include a first solution including water and a relatively low concentration of a first monomer (e.g., an amine-containing monomer such as optionally-substituted m-phenylenediamine) and a second solution including a nonpolar organic liquid and a relatively low concentration of a second monomer (e.g., an acid halide-containing monomer such as an optionally-substituted trimesoyl chloride).

35 Claims, 3 Drawing Sheets

POLYMERIZATION METHODS FOR MEMBRANE FORMATION

RELATED APPLICATIONS

This application claims priority under 35 U.S.C. § 119 (e) to U.S. Provisional Patent Application No. 63/579,279, filed Aug. 28, 2023, and entitled "Polymerization Methods for Membrane Formation," which is incorporated herein by reference in its entirety.

TECHNICAL FIELD

Methods of forming porous media (e.g., membranes for liquid separations or parts thereof) via polymerization, and related articles, are generally described.

BACKGROUND

Membranes that are selectively permeable to liquid and comparatively less permeable to solutes have been used to purify feed streams. As one example, membrane-based desalination has been used to desalinate aqueous feed streams. In one such purification process-generally referred to as forward osmosis-liquid (e.g., a solvent such as water) is transported from a feed stream through a semi-permeable membrane by applying a draw solution (also sometimes referred to as a sweep solution) to the permeate side of the membrane that has an osmotic pressure that is higher than the osmotic pressure of the feed stream. The driving force for separation in a forward osmosis process is the osmotic pressure difference across the semi-permeable membrane; because the draw solution on one side of the membrane has a higher osmotic pressure than the feed stream on the other side of the membrane, the liquid is drawn through the semi-permeable membrane from the feed stream to the draw solution to equalize the osmotic pressures.

Another type of membrane-based solution concentration process is reverse osmosis. In contrast to forward osmosis, reverse osmosis processes use an applied hydraulic pressure as the driving force for separation. The applied hydraulic pressure serves to counteract the osmotic pressure difference that would otherwise favor liquid flux from low osmotic pressure to high osmotic pressure. Therefore in reverse osmosis systems, liquid is driven from the high osmotic pressure side to the low osmotic pressure side.

Many membrane-based solution concentration systems have, to date, been limited by, for example, low efficiencies, low concentration limits, large expense, and undesired fouling and scaling. Improved membranes and methods for forming such membranes are desirable.

SUMMARY

Methods of forming porous media (e.g., membranes for liquid separations or parts thereof) via polymerization, and related articles, are generally described. The subject matter of the present invention involves, in some cases, interrelated products, alternative solutions to a particular problem, and/or a plurality of different uses of one or more systems and/or articles.

In one aspect, methods for forming a porous medium are provided. In some embodiments, the method comprises combining at least a portion of the following two components: (a) a first solution comprising water and optionally-substituted m-phenylenediamine, wherein the optionally-substituted m-phenylenediamine is present in the first solution in an amount of greater than or equal to 0.005% w/v and less than 0.020% w/v; and (b) a second solution comprising a nonpolar organic liquid and optionally-substituted trimesoyl chloride, wherein the optionally-substituted trimesoyl chloride is present in the second solution in an amount of greater than 0.004% w/v and less than or equal to 0.050% w/v; such that at least some of the optionally-substituted m-phenylenediamine and at least some of the optionally-substituted trimesoyl chloride undergo a polymerization reaction to form a polymer layer.

In some embodiments, the method comprises combining at least a portion of the following two components: (a) a first solution comprising water and optionally-substituted m-phenylenediamine, wherein the optionally-substituted m-phenylenediamine is present in the first solution in an amount of greater than or equal to 0.005% w/v and less than or equal to 0.500% w/v; and (b) a second solution comprising a nonpolar organic liquid and optionally-substituted trimesoyl chloride, wherein the optionally-substituted trimesoyl chloride is present in the second solution in an amount of greater than 0.004% w/v and less than or equal to 0.500% w/v; such that at least some of the optionally-substituted m-phenylenediamine and at least some of the optionally-substituted trimesoyl chloride undergo a polymerization reaction to form a polymer layer; wherein the first solution and/or the second solution comprises a polar liquid co-solvent other than water present in an amount of greater than or equal to 0.100% w/v and less than or equal to 10% w/v.

In some embodiments, the method comprises combining at least a portion of the following two components: (a) a first solution comprising water and a first monomer, wherein the first monomer is present in the first solution in an amount of greater than or equal to 0.005% w/v and less than or equal to 0.500% w/v; and (b) a second solution comprising a nonpolar organic liquid and a second monomer, wherein the second monomer is present in the second solution in an amount of greater than 0.004% w/v and less than or equal to 0.500% w/v; such that at least some of first monomer and at least some of the second monomer undergo a polymerization reaction to form a polymer layer. Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Methods of forming porous media (e.g., membranes for liquid separations or parts thereof) via polymerization, and related articles, are generally described. In some instances, two components are combined such that a polymerization (e.g., interfacial polymerization) reaction occurs, resulting in the formation of polymer layer (e.g., an active layer). The polymer layer may be adjacent to a substrate. In some instances, the two components include a first solution including water and a relatively low concentration of a first monomer (e.g., an amine-containing monomer such as optionally-substituted m-phenylenediamine) and a second solution including a nonpolar organic liquid (e.g., n-hexane) and a relatively low concentration of a second monomer (e.g., an acid halide-containing monomer such as optionally-substituted trimesoyl chloride) (e.g., to form a polyamide polymer layer). It has unexpectedly been observed that the use of particular concentration ranges of the respective monomers can result in polymer layers with desirable solute rejection and water permeance properties for at least some applications. In some instances, a co-solvent, such as a polar aprotic liquid (e.g., dimethylsulfoxide, acetone) can contribute to reduced variance in porous medium performance.

In some membrane-based separation processes, such as reverse osmosis and nanofiltration, hydraulic pressure is applied to promote passage of liquid through a semi-permeable membrane. In many such systems, the amount of hydraulic pressure required to cause passage of liquid through the membrane scales with the difference in solute concentration and/or osmotic pressure between the retentate side and the permeate side of the membrane. It can be desirable to configure membranes to reduce the required hydraulic pressure for a given solute concentration and/or osmotic pressure in order to promote energetic efficiency, an increase in concentration limits, and/or promote the durability of the system. It has been realized that one way to reduce required hydraulic pressure is to permit a greater portion of the influent solute to pass through the membrane compared to high-rejection (e.g., 99.8% rejection) reverse osmosis (RO) membranes. Highly saline streams may be treated (e.g., desalinated) with such a membrane configuration because the higher solute permeability can reduce the required hydraulic pressure. In some instances, the membranes are configured such that a greater portion of the influent solute (e.g., solute ions) are rejected by the membrane as compared to nanofiltration (NF) membranes, reducing permeate salinity and increasing retentate outlet salinity. It is believed that highly concentrated streams can be produced using such membranes as compared to lower-rejection nanofiltration membranes because the lower ion permeability increases the degree of separation.

One way to achieve the above-mentioned "intermediate" rejection regime for a membrane is to modify an existing membrane (e.g., a thin-film composite membrane comprising a cross-linked polymer active layer adjacent to a support substrate) to decrease the rejection percentage (e.g., by disrupting cross-links in the active layer). However, it has been realized in the context of this disclosure that it is possible to control the initial membrane formation conditions to arrive at a porous medium that has the desirable rejection range (e.g., an intermediate rejection range) without requiring post-membrane-formation modification. Such a possibility may allow for greater control and/or reduced expense in preparing desirable membranes. For example, it has been observed in the context of this disclosure that judicious choice of reagent concentrations (e.g., monomer concentrations) during polymerization (e.g., interfacial polymerization) that are significantly lower than typical polymerization conditions can result in porous media that can, in some instances, have the desired properties (e.g., rejection ranges). It has been observed, unexpectedly, that in some embodiments even modest deviation from the reagent concentrations described in this disclosure can result in membranes lacking the desired properties.

Figure 1A:
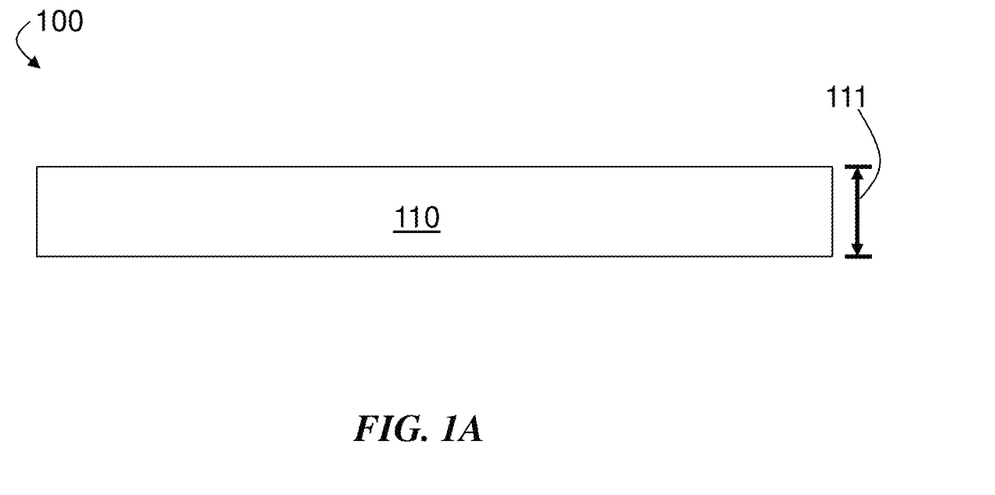
FIG. 1A is a cross-sectional schematic diagram of an example of a porous medium, according to some embodiments.
Figure 1B:
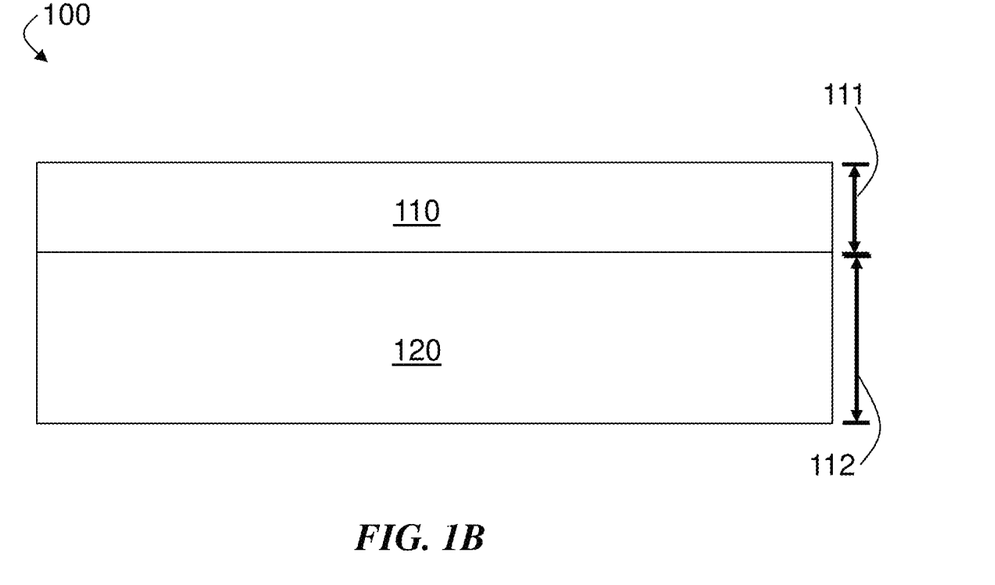
FIG. 1B is a cross-sectional schematic diagram of an example of a porous medium comprising a layer comprising a polymer adjacent to a substrate, according to some embodiments.

Methods (e.g., for forming a porous medium) and related articles are generally described. FIGS. 1A-1B show schematic cross-sectional diagrams of porous medium 100, according to some embodiments. Porous medium 100 may be part or all of a membrane (e.g., a thin-film composite membrane).

In some embodiments, the method comprises combining at least a portion of two or more components. For example, at least a portion of a first solution may be combined with at least a portion of a second solution (e.g., in the presence or absence of additional components such as a solid substrate or additional solutions). One example of a method of forming a porous medium by combining multiple components is interfacial polymerization. Interfacial polymerization may involve step-growth polymerization in which polymerization occurs at the interface of two different phases (e.g., immiscible phases). The immiscible phases may be two liquids (e.g., the first solution and the second solution), a liquid and solid (e.g., a solid-liquid interface), and/or an emulsion in a liquid. As one example, a first solution comprising water as at least a portion of a solvent and solute (or a component of the first solution) may be exposed to a second solution (or a component thereof) comprising a nonpolar organic liquid (e.g., n-hexane) and a solute. In some such instances, the solute from the first solution and the solute from the second solution interact at or near the interface of the water-containing phase and the non-polar liquid phase and undergo a chemical reaction (e.g., a polymerization reaction). Such a process may be performed with or without a solid substrate present, as is discussed below.

In some embodiments, the first solution comprises water and a first monomer (e.g., optionally-substituted m-phenylenediamine). In some embodiments, the first solution comprises water and optionally-substituted m-phenylenediamine. The water may be liquid water. Water may be present in the first solution in an amount of greater than or equal to 75 percent weight in volume (% w/v), greater than or equal to 90% w/v, greater than or equal to 95% w/v, greater than or equal to 98% w/v, greater than or equal to 99% w/v, and/or up to 99.9% w/v, up to 99.95% w/v, or greater.

The compound m-phenylenediamine has the chemical structure shown in structure (I):

(I)

Optionally-substituted m-phenylenediamine in this context refers to a compound in which any of the hydrogens in structure (I) may be replaced with a substituent provided that the choice of substituent does not interfere with the common quality of the compound being able to participate in a polymerization reaction (e.g., with an optionally-substituted trimesoyl chloride) to form a polymer layer (e.g., comprising an at least partially cross-linked polyamide layer). For example, the substituents may be chosen so as not to be so bulky as to prevent or undesirably suppress the polymerization reaction. Additionally, the substituents may be groups that do not react with trimesoyl chloride on the timescale of the polymerization reaction (e.g., the substituents may be less nucleophilic than the amine group). As another example, in some embodiments, the substituents may be chosen so as not to prevent sufficient solubility of the optionally-substituted m-phenylenediamine to achieve the concentration ranges in the first solution discussed in this disclosure. Examples of possible substituents suitable for at least some embodiments include, but are not limited to halo groups (e.g., chloro, bromo, iodo), branched or unbranched $C_1$-$C_8$ aliphatic groups (e.g., $C_1$-$C_4$ aliphatic groups such as $C_1$-$C_4$ alkyl groups), hydroxy groups, carboxylic acid/carboxylate groups, and/or sulfonic acid/sulfonate groups. For example, at least some of the optionally-substituted m-phenylenediamine may comprise an electron-withdrawing group such as a sulfonic acid/sulfonate group or carboxylic acid/carboxylate group at one or more positions such as the 5-position (e.g., m-phenylenediamine-5-sulfonic acid or diaminobenzoic acid).

In some embodiments, at least some of the optionally-substituted m-phenylenediamine present in the first solution is not substituted—that is, in some embodiments where the first solution comprises optionally-substituted m-phenylenediamine, at least some (e.g., at least 25 mole percent (mol %), at least 50 mol %, at least 75 mol %, at least 90 mol %, at least 95 mol %, at least 98 mol %, at least 99 mol %, at least 99.9 mol %, or 100 mol %) of the optionally-substituted m-phenylenediamine has structure (I).

At least some (e.g., at least 25 mol %, at least 50 mol %, at least 75 mol %, at least 90 mol %, at least 95 mol %, at least 98 mol %, at least 99 mol %, at least 99.9 mol %) or all of the optionally-substituted m-phenylenediamine associated with the first solution may be dissolved in the first solution.

The optionally-substituted m-phenylenediamine may be present in the first solution in a relatively low concentration. It has been unexpectedly observed in the context of this disclosure that having a relatively low concentration of the optionally-substituted m-phenylenediamine in the first solution can, in some instances, contribute to the resulting polymer layer of the porous medium (e.g., formed by interfacial polymerization) having a structure that promotes a relatively lower rejection percentage for solute (e.g., NaCl) under at least some conditions as compared to porous media prepared with different concentrations, while still maintaining adequate water permeance and flux and an ability to effectively perform liquid separations. As discussed above, such rejection percentages, which may be lower than that typically used for high-rejection reverse osmosis processes but greater than those used for some nanofiltration processes, may afford an ability to reduce energy and/or capital expenditure and improve membrane durability when concentrating liquid streams such as high-solute-concentration liquid streams. Further, as shown in the examples below, it has been unexpectedly observed that even modest changes in concentration of the optionally-substituted m-phenylenediamine can result in significant changes in rejection percentage.

In some embodiments, the optionally-substituted m-phenylenediamine is present in the first solution in an amount of greater than or equal to 0.005% w/v, greater than or equal to 0.008% w/v, greater than or equal to 0.010% w/v, greater than or equal to 0.012% w/v, or greater. In some embodiments, the optionally-substituted m-phenylenediamine is present in the first solution in an amount of less than or equal to 0.500% w/v, less than or equal to 0.200% w/v, less than or equal to 0.100% w/v, less than or equal to 0.050% w/v, less than 0.020% w/v, less than or equal to 0.018% w/v, less than or equal to 0.015% w/v, or less. Combinations of these ranges are possible. For example, in some embodiments, the optionally-substituted m-phenylenediamine is present in the first solution in an amount of greater than or equal to 0.005% w/v and less than 0.020% w/v (e.g., greater than or equal to 0.005% w/v and less than or equal to 0.015% w/v). Such a range may be suitable for achieving solute rejection percentages useful in certain applications as discussed above. As another example, in some embodiments, the optionally-substituted m-phenylenediamine is present in the first solution in an amount of greater than or equal to 0.005% w/v and less than or equal to 0.500% w/v. The concentration ranges in this paragraph should be understood to refer to the concentration of dissolved optionally-substituted m-phenylenediamine in the first solution.

It should be understood that while the above concentrations ranges are described for optionally-substituted m-phenylenediamine, the ranges may also be suitable for any of a variety of other monomers for the first solution (e.g., other amine-containing monomers).

In some embodiments, the second solution comprises a nonpolar organic liquid and a second monomer (e.g., optionally-substituted trimesoyl chloride). In some embodiments, the second solution comprises a nonpolar organic liquid and optionally-substituted trimesoyl chloride. The nonpolar organic liquid may be present in the second solution in an amount of greater than or equal to 75% w/v, greater than or equal to 90% w/v, greater than or equal to 95% w/v, greater than or equal to 98% w/v, greater than or equal to 99% w/v, and/or up to 99.9% w/v, up to 99.95% w/v, or greater. The nonpolar organic liquid may have a dielectric constant of less than or equal to 5, less than or equal to 3, less than or equal to 2, and/or as low as 1.8, as low as 1.5, or less at 25° C. In some embodiments, the nonpolar organic liquid is immiscible with water at 25° C. Example of nonpolar organic liquids include, but are not limited to alkanes (e.g., n-pentane, hexanes such as n-hexane, n-heptane), alkenes, aromatics (e.g., benzene, toluene, xylene), cyclic organic molecules (e.g., cyclohexane), diethyl ether, and/or chloroform. In some embodiments, the nonpolar organic liquid comprises n-hexane.

The compound trimesoyl chloride has the chemical structure shown in structure (II):

Optionally-substituted trimesoyl chloride in this context refers to a compound in which any of the hydrogens in structure (II) may be replaced with a substituent provided that the choice of substituent does not interfere with the common quality of the compound being able to participate in a polymerization reaction (e.g., with an optionally-substituted trimesoyl chloride) to form a polymer layer (e.g., comprising an at least partially cross-linked polyamide layer). For example, the substituents may be chosen so as not to be so bulky as to prevent or undesirably suppress the polymerization reaction. Additionally, the substituents may be groups that do not react with m-phenylenediamine on the timescale of the polymerization reaction (e.g., the substituents may be less electrophilic than an acid chloride group). As another example, in some embodiments, the substituents may be chosen so as not to prevent sufficient solubility of the optionally-substituted trimesoyl chloride to achieve the concentration ranges in the second solution discussed in this disclosure. Examples of possible substituent suitable for at least some embodiments include, but are not limited to halo groups (e.g., chloro, bromo, iodo), branched or unbranched $C_1$-$C_8$ aliphatic groups (e.g., $C_1$-$C_4$ aliphatic groups such as $C_1$-$C_4$ alkyl groups), and/or hydroxy groups. In some embodiments, at least some of the optionally-substituted trimesoyl chloride present in the second solution is not substituted—that is, in some embodiments where the second solution comprises optionally-substituted trimesoyl chloride at least some (e.g., at least 25 mol %, at least 50 mol %, at least 75 mol %, at least 90 mol %, at least 95 mol %, at least 98 mol %, at least 99 mol %, at least 99.9 mol %, or 100 mol %) of the optionally-substituted trimesoyl chloride has structure (II).

At least some (e.g., at least 25 mol %, at least 50 mol %, at least 75 mol %, at least 90 mol %, at least 95 mol %, at least 98 mol %, at least 99 mol %, at least 99.9 mol %) or all of the optionally-substituted trimesoyl chloride associated with the second solution may be dissolved in the second solution.

The optionally-substituted trimesoyl chloride may be present in the second solution in a relatively low concentration. It has been unexpectedly observed in the context of this disclosure that having a relatively low concentration of the optionally-substituted trimesoyl chloride in the second solution can, in some instances, contribute to the resulting polymer layer of the porous medium (e.g., formed by interfacial polymerization) having a structure that promotes a relatively lower rejection percentage for solute (e.g., NaCl) under at least some conditions as compared to porous media prepared with different concentrations, while still maintaining adequate water permeance and flux and an ability to effectively perform liquid separations. It has also been observed in the context of this disclosure that having too low of a concentration of the optionally-substituted trimesoyl chloride can limit the above-mentioned observed effect with respect to rejection percentage. Further, as shown in the examples below, it has been unexpectedly observed that even modest changes in concentration of the optionally-substituted trimesoyl chloride can result in significant changes in rejection percentage.

In some embodiments, the optionally-substituted trimesoyl chloride is present in the second solution in an amount of greater than 0.004% w/v, greater than or equal to 0.005% w/v, greater than or equal to 0.008% w/v, or greater. In some embodiments, the optionally-substituted trimesoyl chloride is present in the second solution in an amount of less than or equal to 0.500% w/v, less than or equal to 0.200% w/v, less than or equal to 0.100% w/v, less than or equal to 0.050% w/v, less than or equal to 0.020% w/v, less than or equal to 0.018% w/v, less than or equal to 0.015% w/v, less than or equal to 0.012% w/v, less than or equal to 0.010% w/v, or less. Combinations of these ranges are possible. For example, in some embodiments, the optionally-substituted trimesoyl chloride is present in the second solution in an amount of greater than 0.004% w/v and less than or equal to 0.050% w/v (e.g., greater than 0.004% w/v and less than or equal to 0.010% w/v). This range may be suitable for achieving solute rejection percentages useful some certain applications as discussed above. As another example, in some embodiments, the optionally-substituted trimesoyl chloride is present in the second solution in an amount of greater than 0.004% w/v and less than or equal to 0.500% w/v. The concentration ranges in this paragraph should be understood to refer to the concentration of dissolved optionally-substituted trimesoyl chloride in the second solution.

It should be understood that while the above concentrations ranges are described for optionally-substituted trimesoyl chloride, the ranges may also be suitable for any of a variety of other monomers for the second solution (e.g., other acid halide-containing monomers).

In some embodiments, at least a portion of the first solution and at least a portion of the second solution are combined such that at least some of the optionally-substituted m-phenylenediamine and at least some of the optionally-substituted trimesoyl chloride undergo a polymerization reaction to form a polymer layer. In some embodiments where the porous medium is part of a thin-layer composite membrane, the polymer layer is some or all of the active layer of the membrane that predominantly determines the liquid separation properties of the membrane. As noted above, the polymerization reaction may occur via an interfacial polymerization process involving at least a portion of the first solution and at least a portion of the second solution. FIGS. 1A-1B show polymer layer 110 of porous medium 100. The polymer layer may comprise a polymer where at least some of the repeat units are supplied by the optionally-substituted m-phenylenediamine and at least some of the repeat units are supplied by the optionally-substituted trimesoyl chloride. For example, such a polymer may comprise a polyamide polymer. It should be understood that other non-polymer components (e.g., solvent, adsorbed species, solid particles, filler material) may be present in the polymer layer (e.g., in pores of the polymer layer and/or adsorbed/bound to surfaces of the polymer layer). In some embodiments, at least 50 wt %, at least 75 wt %, at least 90 wt %, at least 95 wt %, and/or up to 99 wt % or more of solid material in the polymer layer is the polymer product of the polymerization reaction (e.g., a polyamide).

The polymer of the polymer layer may be only partially cross-linked, in some embodiments. For example, in some embodiments, fewer than all (e.g., less than or equal to 95 mol %, less than or equal to 90 mol %, less than or equal to 80 mol %, less than or equal to 60 mol %, or less) of the amine groups of the optionally-substituted m-phenylenediamine monomers and/or fewer than all (e.g., less than or equal to 95 mol %, less than or equal to 90 mol %, less than or equal to 80 mol %, less than or equal to 60 mol %, or less) of the acid chloride groups of the optionally-substituted trimesoyl chloride monomers form an amide bond connecting to a different repeat unit of the polymer. Without wishing to be bound by any particular theory, a lack of complete crosslinking in the polymer layer (e.g., polyamide layer) may contribute to the lower solute rejection rates observed in this disclosure.

In some embodiments, the polymer layer has a sufficiently high molecular weight cutoff (MWCO) to allow liquid and in some instances some solute to pass through the porous medium, but a sufficiently low molecular weight cutoff to provide suitable selectivity. In some embodiments, the polymer layer has a molecular weight cutoff of greater than or equal to 50 Da, greater than or equal to 100 Da, greater than or equal to 200 Da, and/or up to 300 Da, up to 400 Da, or greater. Combinations of these ranges are possible.

In some embodiments, the polymer layer has an average thickness that is relatively small. FIG. 1A shows average thickness 111 of polymer layer 110 of porous medium 100. Having a relatively small thickness may promote suitable liquid permeance and other liquid separation performance metrics. In some embodiments, the polymer layer has an average thickness (as measured by, for example, scanning electron microscopy) of less than or equal to 1000 nm, less than or equal to 500 nm, less than or equal to 200 nm, and/or as low as 150 nm, as low as 100 nm, or lower.

In some but not necessarily all embodiments, an additional liquid (e.g., a co-solvent) is present in the first solution (e.g., an additional liquid other than water) and/or in the second solution (e.g., an additional liquid other than the nonpolar organic liquid). The additional liquid may be a polar liquid co-solvent. The additional liquid may be in the liquid phase at the temperature at which the methods of this disclosure are performed (e.g., at a temperature of greater than or equal to 10° C., greater than or equal to 15° C., greater than or equal to 20° C., greater than or equal to 22° C., and/or up to 25° C., up to 30° C., up to 35° C., up to 40° C., or greater). The polar liquid may be a polar organic liquid. In some embodiments, the polar liquid co-solvent is a polar aprotic liquid. Examples of polar aprotic liquids include, but are not limited to, dimethylsulfoxide (DMSO), acetone, acetonitrile, N,N-dimethylformamide (DMF), ethyl acetate, tetrahydrofuran (THF), and/or pyridine. In some embodiments, the polar liquid (e.g., co-solvent) comprises DMSO. In some embodiments, the polar liquid co-solvent has a dielectric constant of greater than or equal to 6, greater than or equal to 10, greater than or equal to 20, and/or up to 50, up to 60, or greater when measured at 25° C. It has been observed in the context of this disclosure that a polar organic solvent in the first solution and/or in the second solution can contribute to reduced sample-to-sample variance in some performance parameters such as NaCl rejection rate when forming the porous media. Such a reduction in variance can improve manufacturing reliability and lower manufacturing costs (e.g., when manufacturing membranes for liquid separations). Unexpectedly, the observed decrease in variance is observed even with relatively low concentrations of reagents (e.g., optionally-substituted m-phenylenediamine, optionally-substituted trimesoyl chloride).

The polar liquid co-solvent (e.g., the polar aprotic liquid co-solvent) may be present in the first solution and/or the second solution in a sufficient concentration to affect the polymerization reaction (e.g., to reduce variance in performance properties) but a low enough concentration so as not to interfere with the interaction between the primary liquids of the first solution and the second solution (e.g., the water and the nonpolar liquid). In some embodiments, the polar liquid solvent is present in the first solution and/or in the second solution in an amount of greater than or equal to 0.100% w/v, greater than or equal to 0.200% w/v, greater than or equal to 0.500% w/v, greater than or equal to 1.00% w/v, greater than or equal to 2.00% w/v, and/or up to 5.00% w/v, up to 10% w/v, or greater. Combinations of these ranges (e.g., greater than or equal to 0.100% w/v and less than or equal to 10% w/v, greater than or equal to 0.500% w/v and less than or equal to 2% w/v) are possible.

As mentioned above, the porous medium formed by the methods of this disclosure may form all or part of a membrane. For example, the membrane may be a semi-permeable membrane. In general, a semi-permeable membrane is a barrier that allows some components of a mixture to pass through while blocking at least some of other components (e.g., blocking all of another component, or reducing the relative rate of permeation of another component). For example, a semi-permeable membrane may block some molecules in a liquid solution from passing through while allowing others to pass through. In some instances, a semi-permeable membrane blocks some molecules and permits other molecules to pass through based on their molecular weight and/or charge. As noted above, a semi-permeable membrane can be used for osmotic processes. For example, the semi-permeable membrane may be an osmotic membrane. An osmotic membrane may be capable of producing an osmotic pressure difference between solutions on either side of the membrane upon application of a hydraulic pressure difference across the two sides of the membrane. For example, if an osmotic membrane is placed between two solutions of identical composition such that there is initially no osmotic pressure difference across the membrane, application of a hydraulic pressure difference across the osmotic membrane may allow for transport of components from one side of the membrane to the other such that an osmotic pressure difference across the two sides of the membrane is established. Semi-permeable membranes may also be used for nanofiltration processes. Semi-permeable membranes may be configured for osmotic processes, nanofiltration processes, and/or processes in which separation is achieved based on a combination of nanofiltration and osmotic mechanisms (e.g., based on, for example, the molecular weight cutoff of the membranes, pore sizes of the membranes, the nature of the mixtures to which they are exposed, and a magnitude of applied hydraulic pressure).

One way in which the porous medium may be configured is with a substrate. The substrate may be a solid material (e.g., in the form of a layer) that contributes mechanical support to the overall membrane. In some embodiments, the polymer layer is adjacent to the substrate. For example, in FIG. 1B, porous medium 100 comprises polymer layer 110 adjacent to substrate 120, in accordance with some embodiments. In some embodiments, at least a portion of the polymer layer (e.g., formed by the polymerization reaction involving the combining of the first solution and the second solution) is directly adjacent to the substrate such that no intervening components are between the portion of the polymer layer and at least a portion of the substrate. In some embodiments, however, at least a portion of the polymer layer is indirectly adjacent to the substrate such that one or more intervening components (e.g., other layers such as coatings) are between the portion of the polymer layer and the substrate. In some embodiments, at least a portion of the polymer layer is located within 10 microns, within 1 micron, within 0.5 microns, within 0.1 microns, or less of at least a portion of the substrate. While the cross-sectional schematic diagram in FIG. 1B shows a distinct spatial boundary between polymer layer 110 and substrate 100, such a distinct boundary need not be present in every embodiment. For example, at least a portion of the polymer layer may penetrate into at least a portion of the interior volume of the substrate (e.g., due to impregnation of one or more pores of the substrate by the polymer layer and/or the monomer reagents that form the polymer layer).

One example of a membrane in which a polymer layer (e.g., an active layer such as a polyamide layer) is adjacent to a substrate is a thin-film composite membrane.

The substrate may have a greater average thickness than the polymer layer. The larger thickness may contribute to the overall porous medium having good mechanical characteristics (e.g., for experiencing relatively high hydraulic and/or hydrostatic pressures). For example, in FIG. 1B, substrate 120 has average thickness 112, which is greater than average thickness 111 of polymer layer 110. In some embodiments, the substrate has an average thickness of greater than or equal to 1 micron, greater than or equal to 2 microns, greater than or equal to 5 microns, greater than or equal to 10 microns, and/or up to 20 microns, up to 50 microns, or greater. Combinations of these ranges are possible.

The substrate may comprise any of a variety of materials, such as polymeric materials, ceramic materials, and/or metal-containing materials. Examples of potentially suitable polymeric materials include, but are not limited to, polyethersulfone (PES) and/or polysulfone (PS). In some embodiments, at least 50 wt %, at least 75 wt %, at least 90 wt %, at least 95 wt %, at least 98 wt %, at least 99 wt %, or all of the solid mass of the substrate is a polymeric material such as polyethersulfone and/or polysulfone.

In some embodiments, the substrate is porous. For example, the substrate may be microporous. In some instances, the substrate has a greater average pore size than the polymer layer (e.g., formed by the polymerization reaction discussed above). In some embodiments, the substrate has a greater molecular weight cutoff than the polymer layer. As such, in some instances the overall molecular weight cutoff of a membrane comprising the polymer layer and the substrate may be predominantly (or completely) based on the molecular weight cutoff of the polymer layer. In some embodiments, the substrate has a molecular weight cutoff of greater than or equal to 10 kDa, greater than or equal to 20 kDa, greater than or equal to 50 kDa, and/or up to 75 kDa, up to 100 kDa, or greater. Combinations of these ranges (e.g., greater than or equal to 10 kDa and less than or equal to 100 kDa) are possible.

As mentioned above, the porous medium (e.g., as part of a membrane) may be formed by combining at least a portion of the first solution and at least a portion of the second solution such that a polymerization (e.g., an interfacial polymerization) reaction occurs. In some such embodiments, such a process comprises exposing the substrate to the first solution and the second solution. In some instances, the substrate is exposed to the first solution and the second simultaneously. In other instances, there is at least some time separation between the exposure of the substrate to the first solution and the second solution.

As mentioned above, in some embodiments, the substrate is exposed to the first solution. The substrate may be exposed to the first solution for any of a variety of durations (e.g., greater than or equal to 5 minutes, greater than or equal to 10 minutes, and/or up 15 minutes, or more). As also mentioned above, in some embodiments, the substrate is exposed to the second solution. The substrate may be exposed to the second solution for any of a variety of durations (e.g., greater than or equal to 15 seconds, greater than or equal to 30 seconds, greater than or equal to 60 seconds, greater than or equal to 1 minutes, greater than or equal to 2 minutes, and/or up to 5 minutes or more). In some embodiments, the duration of time during which the polymerization reaction is permitted to occur is greater than or equal to 15 seconds, greater than or equal to 30 seconds, greater than or equal to 60 seconds, greater than or equal to 1 minutes, greater than or equal to 2 minutes, and/or up to 5 minutes or more. The duration may affect the properties of the resulting polymer layer, such as its thickness, degree of cross-linking, porosity, molecular weight cutoff, water permeance, and/or rejection rate (e.g., for NaCl or other solute).

In some embodiments, the substrate is exposed to the first solution prior to at least some of the second solution being exposed to the substrate. In some such embodiments, following the exposure of the substrate to the first solution, at least some of the first solution is removed from the substrate (e.g., mechanically such as draining), resulting in an optionally-substituted-m-phenylenediamine-associated substrate. For example, the optionally-substituted m-phenylenediamine may be adsorbed to a surface of the substrate or within pores of the substrate, and/or within residual solution adsorbed to a surface of the substrate or within pores of the substrate. In some embodiments, subsequently, the optionally-substituted-m-phenylenediamine-associated substrate is exposed to the second solution. This may result in a polymerization reaction (e.g., interfacial polymerization) occurring between the remaining optionally-substituted m-phenylenediamine from the first solution and the optionally-substituted trimesoyl chloride from the second solution, thereby forming the polymer layer (e.g., adjacent to the substrate). As one example, the first solution may be applied to the substrate (e.g., by pouring the first solution on to at least a portion of the substrate). Then, after a period of time (e.g., soaking), at least some of the first solution may be removed (e.g., via draining). In some such instances, a drying step may then be performed. Then, the second solution may be applied to the substrate (e.g., by pouring the second solution on to at least a portion of the substrate). As a result, the polymerization reaction may then be initiated as the reagents interact.

The order of exposure of the first solution and the second solution may be reversed compared to the embodiments discussed above. In some embodiments, the substrate is exposed to the second solution prior to at least some of the first solution being exposed to the substrate. In some such embodiments, following the exposure of the substrate to the second solution, at least some of the second solution is removed from the substrate (e.g., mechanically such as draining), resulting in an optionally-trimesoyl chloride-associated substrate. For example, the optionally-substituted trimesoyl chloride may be adsorbed to a surface of the substrate or within pores of the substrate, and/or within residual solution adsorbed to a surface of the substrate or within pores of the substrate. In some embodiments, subsequently, the optionally-substituted-trimesoyl chloride-associated substrate is exposed to the first solution. This may result in a polymerization reaction (e.g., interfacial polymerization) occurring between the remaining optionally-substituted trimesoyl chloride from the second solution and the optionally-substituted m-phenylenediamine from the first solution, thereby forming the polymer layer (e.g., adjacent to the substrate). As one example, the second solution may be applied to the substrate (e.g., by pouring the second solution on to at least a portion of the substrate). Then, after a period of time (e.g., soaking), at least some of the second solution may be removed (e.g., via draining). In some such instances, a drying step may then be performed. Then, the first solution may be applied to the substrate (e.g., by pouring the first solution on to at least a portion of the substrate). As a result, the polymerization reaction may then be initiated as the reagents interact.

In some embodiments, the resulting porous medium (e.g., a membrane) has a relatively low rejection for NaCl as compared to porous media formed by other methods. In some, but not necessarily all embodiments, based on a screening test, the porous medium has a rejection for NaCl of less than or equal to 30%, less than or equal to 20%, less than or equal to 15%, and/or as low as 12%, as low as 10%, as low as 8%, as low as 5%, or less at a temperature of 25° C. when measured using 20% w/w of NaCl in deionized water with an operational trans-membrane pressure at at least one value in the range of 60-80 bar (e.g., 70 bar) and a cross-flow velocity at at least one value in the range of 0.02 to 0.2 meters/second (e.g., 0.1 meters/second). The rejection, R, of a porous medium during a liquid separation process can be calculated from $C_R$ (the concentration of solute on the retentate side of the membrane) and $C_P$ (the concentration of solute on the permeate side of the membrane) and expressed as a percentage using Equation [1] below:

$$R=[1-(C_P/C_R)]*100 \qquad [1]$$

In some, but not necessarily all embodiments, based on a screening test, the porous medium has a rejection for NaCl of less than or equal to 30%, less than or equal to 20%, less than or equal to 15%, and/or as low as 12%, as low as 10%, as low as 8%, as low as 5%, or less at a temperature of 25° C. when measured using 2000 ppm of NaCl in deionized water with an operational trans-membrane pressure of 5 bar and a volumetric flow rate of 1.0 L min$^{-1}$ fed to the medium.

In some, but not necessarily all embodiments, based on a screening test at a temperature of 25° C. when measured using 20% w/w of NaCl in deionized water with an operational trans-membrane pressure of 70 bar and a cross-flow velocity at at least one value in the range of 0.02 to 0.2 meters/second (e.g., 0.1 meters/second), the porous medium (e.g. membrane) has a rejection for NaCl of less than or equal to 25%, less than or equal to 22%, less than or equal to 20%, and/or as low as 15%, as low as 10%, as low as 5%, or less. Combinations of these ranges (e.g., less than or equal to 25% and greater than 5%, of less than or equal to 22% and greater than 10%, of less than or equal to 20% and greater than 15%) are possible. In some, but not necessarily all embodiments, based on a screening test at a temperature of 25° C. when measured using 15% w/w of NaCl in deionized water with an operational trans-membrane pressure of 70 bar and a cross-flow velocity at at least one value in the range of 0.02 to 0.2 meters/second (e.g., 0.1 meters/second), the porous medium (e.g. membrane) has a rejection for NaCl of less than or equal to 45%, less than or equal to 42%, less than or equal to 40%, and/or as low as 25%, as low as 15%, as low as 10%, or less. Combinations of these ranges (e.g., less than or equal to 45% and greater than 10%, of less than or equal to 42% and greater than 15%, of less than or equal to 40% and greater than 25%) are possible. In some, but not necessarily all embodiments, based on a screening test at a temperature of 25° C. when measured using 10% w/w of NaCl in deionized water with an operational trans-membrane pressure of 70 bar and a cross-flow velocity at at least one value in the range of 0.02 to 0.2 m/second (e.g., 0.1 meters/second), the porous medium (e.g. membrane) has a rejection for NaCl of less than or equal to 90%, less than or equal to 85%, less than or equal to 80%, and/or as low as 15%, as low as 10%, as low as 5%, or less. Combinations of these ranges (e.g., less than or equal to 90% and greater than 15%, of less than or equal to 85% and greater than 25%, of less than or equal to 80% and greater than 50%) are possible.

In some, but not necessarily all embodiments, the resulting porous medium (e.g., a membrane) has a relatively low water permeance as compared to porous media formed by other methods. In some embodiments, based on a screening test, the porous medium has a water permeance of less than or equal to 10 L m$^{-2}$ h$^{-2}$ bar$^{-1}$, less than or equal to 9 L m$^{-2}$ h$^{-2}$ bar$^{-1}$, and/or as low as 8 L m$^{-2}$ h$^{-2}$ bar$^{-1}$, as low as 5 L m$^{-2}$ h$^{-2}$ bar$^{-1}$, or less at a temperature of 25° C. when measured using 20% w/w of NaCl in deionized water with an operational trans-membrane pressure of 70 bar and a cross-flow velocity at at least one value in the range of 0.02 to 0.2 meters/second (e.g., 0.1 meters/second). Water permeance can be calculated from the water flux, pressure differential, and osmotic differential, as shown below in Equation [2]:

$$J_W=A(\Delta P-\Delta \pi) \qquad [2]$$

In the above equation [2], $J_w$ represents the flux of water through the porous medium, $\Delta P$ represents the hydraulic pressure differential across the porous medium, $\Delta \pi$ represents the osmotic pressure differential across the porous medium, and A represents the water permeance.

In some, but not necessarily all embodiments, the resulting porous medium (e.g., a membrane) has a relatively low water permeance as compared to porous media formed by other methods. In some embodiments, based on a screening test, the porous medium has a water permeance of less than or equal to 10 L m$^{-2}$ h$^{-2}$ bar$^{-1}$, less than or equal to 9 L m$^{-2}$ h$^{-2}$ bar$^{-1}$, and/or as low as 8 L m$^{-2}$ h$^{-2}$ bar$^{-1}$, as low as 5 L m$^{-2}$ h$^{-2}$ bar$^{-1}$, or less at a temperature of 25° C. when measured using 2000 ppm of NaCl in deionized water with an operational trans-membrane pressure of 5 bar and a volumetric flow rate of 1.0 L min$^{-1}$ fed to the medium.

The porous media (e.g., membranes) prepared according to this disclosure can be employed in any of a variety of applications. For example, membranes comprising the porous media can be used in liquid separations. As one example, a membrane separator comprising at least one of the membranes of this disclosure may have a retentate side and a permeate side established by the membranes. The membrane separator may receive a retentate inlet stream (e.g., comprising a liquid and a solute) and may output a retentate outlet stream having a higher osmotic pressure than the retentate inlet solution. At least a portion of liquid and solute may pass from the retentate side, through the membrane, and to the permeate side (e.g., at least in part due to application of hydraulic pressure), thereby forming some or all of a permeate outlet stream, which may have a lower osmotic pressure than the retentate inlet stream. Non-limiting examples of methods and systems that can employ the porous media are described in the following references: U.S. Patent Application Publication No. 2022-0380233, published on Dec. 1, 2022, entitled "Osmotic Methods and Systems Involving Energy Recovery," and filed as U.S. patent application Ser. No. 17/882,701 on Aug. 8, 2022; and U.S. patent application Ser. No. 18/315,130, filed on May 10, 2023, and entitled, "Liquid Separation Using Solute-Permeable Membranes and Related Systems," each of which is incorporated by reference in its entirety for all purposes.

U.S. Provisional Patent Application No. 63/579,279, filed Aug. 28, 2023, and entitled "Polymerization Methods for Membrane Formation," is incorporated herein by reference in its entirety.

EXAMPLE EMBODIMENT

Figure 2:
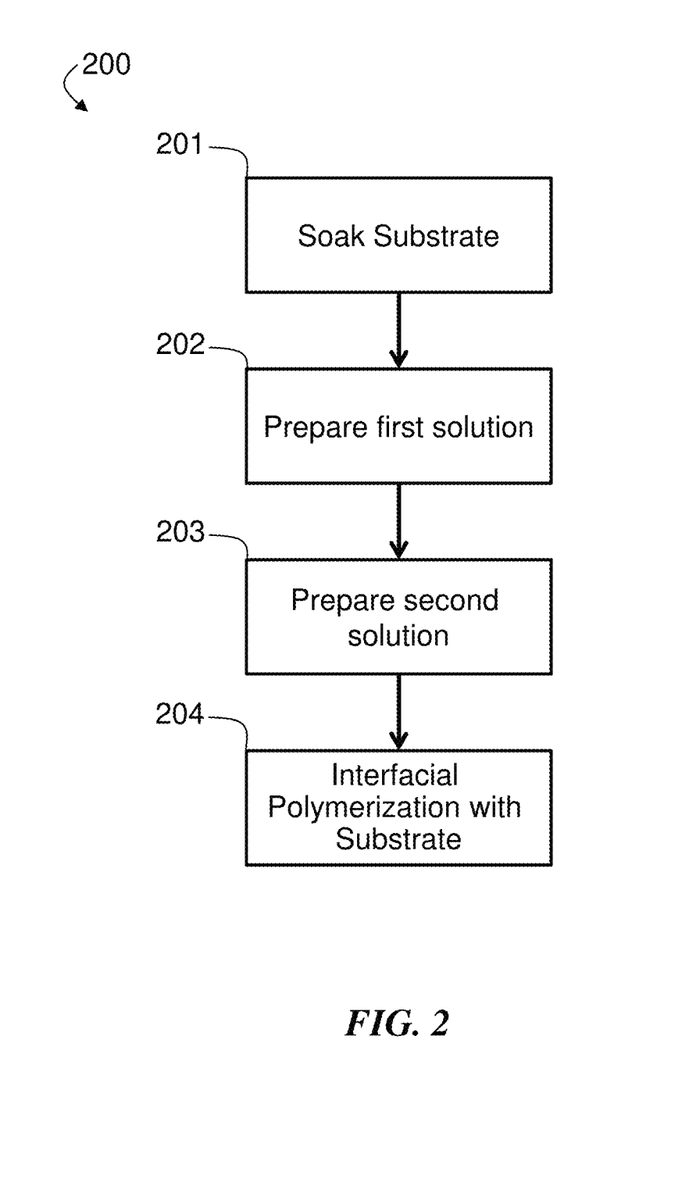
FIG. 2 is a flow-chart of an example of a method of forming a porous medium, according to some embodiments.

The following is a description of an example of an embodiment of a method for preparing a membrane for liquid separation (e.g., desalination) comprising a porous medium. FIG. 2 shows a flow chart representing various steps of method 200 of this example embodiment.

Substrate Soaking

First, the substrate (e.g., a polyethersulfone or a polysulfone ultrafiltration substrate) is soaked in ultrapure water (UPW) overnight (e.g., 16 or 24 hours) such that the substrate is completely wetted. It is believed that this step helps to leach out preservatives or contaminants on the substrate. This step is represented by step 201 in FIG. 2.

Preparation of First Solution

Next, the first solution is prepared by dissolving 75 mg of MPD in a combination of 5.0 mg of dimethylsulfoxide (DMSO) and a sufficient amount of UPW to result in a 500 mL overall solution. This step is represented by step 202 in method 200 in FIG. 2.

Preparation of the Second Solution

Next, the second solution is prepared by dissolving 50 mg of TMC in 500 mL of n-hexane. This step is represented by step 203 in method 200 in FIG. 2.

Interfacial Polymerization

An interfacial polymerization process is then performed using the soaked substrate, the first solution, and the second solution at 25° C. This overall step is represented by step 204 in FIG. 2.

The fully soaked substrate is secured in a frame with the glossy side facing upwards in the frame and the matte side facing downwards. The substrate is roughly cut down to the size of the frame. Then, 100 mL of the first solution prepared as described above is poured onto the frame and allowed to soak the substrate for 10 minutes. The first solution is then drained, and the exposed substrate is briefly rinsed with UPW. Then, the substrate is removed from the frame and dabbed with Kimwipes such that no visible droplets can be observed on the substrate. The substrate is then dried using an air knife for 2 minutes using a sound level of 78.5 dBA.

Next, the substrate and frame are reassembled, and 100 mL of the second solution is poured onto the frame and allowed to soak for 60 seconds. The second solution is drained from the resulting membrane, which is removed from the frame and stored in deionized water with 1.0% sodium metabisulfite (SMBS) for future use.

The following examples are intended to illustrate certain embodiments of the present invention, but do not exemplify the full scope of the invention.

Example 1

This example describes the formation of an example of a membrane comprising a porous medium in accordance with this disclosure. Specifically, this example describes the formation of a thin film composite membrane with a polyamide active layer using the general procedure described in the Example Embodiment described above, with the conditions specified below.

In this Example, Sample 1 was synthesized by interfacial polymerization using (1) a first solution having a concentration of m-phenylenediamine (MPD) of 0.015% w/v in ultrapure water with 1% w/v dimethylsulfoxide (DMSO) as a co-solvent and (2) a second solution having a concentration of trimesoyl chloride (TMC) of 0.010% w/v in n-hexane. After applying 100 mL of the first solution to a polysulfone ultrafiltration substrate with a 50,000 Da molecular weight cutoff (MWCO) and waiting 10 minutes, the first solution was drained from the substrate and the substrate was dried, at which point the second solution was applied to the substrate and allowed to soak for 60 seconds. During this time period interfacial polymerization occurred, resulting in the formation of a polyamide polymer layer on the polysulfone substrate. The second solution was drained from the resulting Sample 1 membrane, and the membrane was rinsed with n-hexane and then stored in deionized water/1% sodium metabisulfite (SMBS) solution.

The reaction conditions for Sample 1 preparation are compared in Table 1 with those used in Li, L. Q., Tang, Y. J., & Xu, Z. L. (2022). "Can the NF membrane directly obtained by the interfacial polymerization of MPD and TMC?" $Journal\ of\ Membrane\ Science$, 656, 120618 ("Li et al. 2022"). Notably, different concentrations of MPD and TMC were employed.

TABLE 1

Comparison of membrane synthesis conditions.

| | Li et al. 2022 | Sample 1 |
|---|---|---|
| MPD Concentration (% w/v) | 0.020 | 0.015 |
| TMC Concentration (% w/v) | 0.004 | 0.010 |
| Reaction time (s) | 60 | 60 |
| Substrate Type | Polyethersulfone (ultrafiltration) | Polysulfone (ultrafiltration) |
| Substrate MWCO (Da) | 50,000 | 50,000 |

Example 2

This example describes the testing of performance metrics of Sample 1 and a comparison with the membrane formed in Li et al. 2022.

Specifically, membrane pure water permeance and rejection for NaCl were evaluated for Sample 1 under the following conditions: a trans-membrane pressure of 5.2 bar, a volumetric flow rate of 1.0 L min$^{-1}$ fed to the membrane (matching the flow rate used in Li et al. 2022), a temperature of 22° C., and a feed concentration of NaCl in water of 2080 ppm. Prior to testing, Sample 1 was subjected to 60 minutes of steady-state compression at the 5.2 bar pressure. These conditions were substantially similar to those used in Li et al., 2022, and so the performance metrics are directly comparable for the purposes of evaluating the unexpectedly stark effects of the methods of this disclosure.

Table 2 shows a comparison of the water permeance and rejection results for Sample 1 as compared with those reported in Li et al. 2022. As can be from these results, the use of different concentrations of MPD and TMC in preparing Sample 1 contributes to significant differences in measured permeance and rejection, with Sample 1 having a 3-fold reduction in rejection percentage compared to Li et al. while maintain a suitable pure water permeance. The combination of suitable permeance and lower rejection in Sample 1 compared to Li et al. can be advantageous for some applications, such as where it is desirable to pass a sufficient amount of solute through the membrane during membrane-based liquid separations to reduce osmotic pressure differentials across the membrane, which can reduce the overall pressure (and energy) required for the separation. Without wishing to be bound by any particular theory, it is believed that the change in monomer concentrations for the interfacial polymerization leads to a change in kinetic conditions that result in differences in cross-linking extent and behavior, with an unexpectedly large effect on resulting membrane performance.

TABLE 2

Comparison of water permeance and rejection percentages.

| | Li et al. 2022 | Sample 1 |
|---|---|---|
| Water permeance (L m$^{-2}$ h$^{-1}$ bar$^{-1}$) | 13 | 8.8 |
| NaCl Rejection (%) | 33 | 11 |

Example 3

Figure 3:
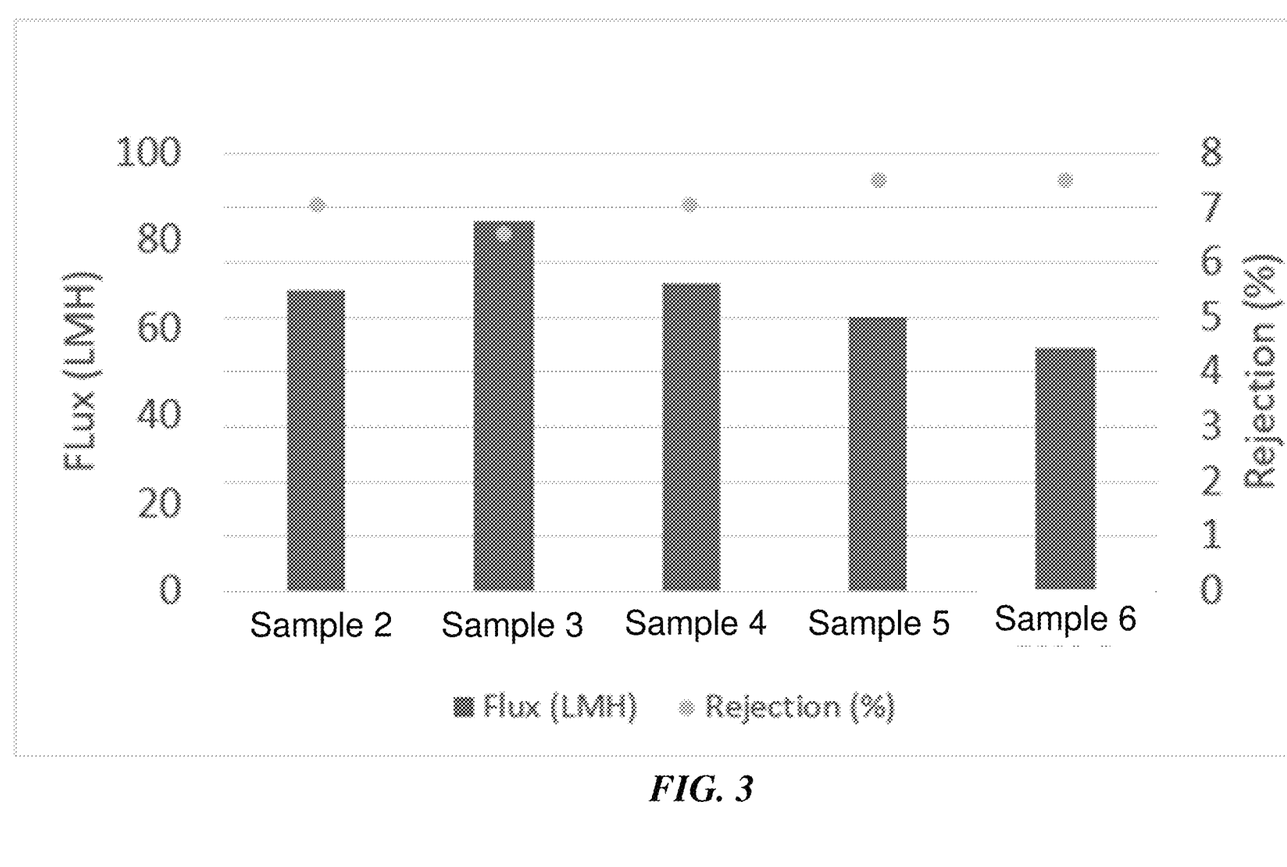
FIG. 3 shows a plot of data for flux and NaCl rejection percentage for examples of membranes comprising porous media, according to some embodiments.

This example describes the testing of performance metrics of 5 replicates of flat sheet membranes. The water flux and NaCl rejection percentage of Samples 2-6 (formed using the procedure described for Sample 1 in Example 1, but without pre-compaction) were measured using the same conditions as in Example 2 for Sample 1. FIG. 3 shows a plot of the water flux ((L m$^{-2}$ h$^{-1}$, "LMH") and the rejection percentages for each of Samples 2-6. The samples had an average rejection percentage of 7.1±0.5%. The desirably low level of variance in rejection percentage for the membranes is believed to be a result of the inclusion of a polar co-solvent (e.g., a polar aprotic organic co-solvent) in at least one of the solutions used for interfacial polymerization.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

As used herein in the specification and in the claims, the phrase "at least a portion" means some or all. "At least a portion" may mean, in accordance with certain embodiments, at least 1 wt %, at least 2 wt %, at least 5 wt %, at least 10 wt %, at least 25 wt %, at least 50 wt %, at least 75 wt %, at least 90 wt %, at least 95 wt %, or at least 99 wt %, and/or, in certain embodiments, up to 100 wt %.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Unless clearly indicated to the contrary, concentrations and percentages described herein are on a mass basis.

As used herein, "wt %" is an abbreviation of weight percentage. As used herein, "at %" is an abbreviation of atomic percentage.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for forming a porous medium, comprising:
combining some or all of the following two components:
(a) a first solution comprising water and optionally substituted m-phenylenediamine, wherein the optionally substituted m-phenylenediamine is present in the first solution in an amount of greater than or equal to 0.005% w/v and less than or equal to 0.500% w/v; and
(b) a second solution comprising a nonpolar organic liquid and optionally substituted trimesoyl chloride, wherein the optionally substituted trimesoyl chloride is present in the second solution in an amount of greater than 0.004% w/v and less than or equal to 0.500% w/v;
wherein some or all of the optionally substituted m-phenylenediamine and some or all of the optionally substituted trimesoyl chloride undergo a polymerization reaction to form a polymer layer;
wherein the first solution and/or the second solution comprises a polar liquid co-solvent other than water present in an amount of greater than or equal to 0.100% w/v and less than or equal to 10% w/v.

2. The method of claim 1, wherein the combining comprises exposing a substrate to the first solution and the second solution.

3. The method of claim 2, wherein the exposing the substrate to the first solution is performed prior to some or all of the exposing the substrate to the second solution.

4. The method of claim 2, wherein following the exposing the substrate to the first solution, some or all of the first solution is removed from the substrate, resulting in the substrate being associated with the optionally substituted m-phenylenediamine, and the exposing the substrate to the second solution comprises exposing the substrate associated with the optionally substituted m-phenylenediamine to the second solution.

5. The method of claim 2, wherein the exposing the substrate to the first solution is performed for greater than or equal to 5 minutes and less than or equal to 15 minutes.

6. The method of claim 2, wherein the exposing the substrate to the second solution is performed for greater than or equal to 15 seconds and less than or equal to 5 minutes.

7. The method of claim 1, wherein the optionally substituted m-phenylenediamine is present in the first solution in an amount of greater than or equal to 0.005% w/v and less than or equal to 0.015% w/v.

8. The method of claim 1, wherein the m-phenylenediamine is unsubstituted.

9. The method of claim 1, wherein the optionally substituted trimesoyl chloride is present in the second solution in an amount of greater than 0.004% w/v and less than or equal to 0.010% w/v.

10. The method of claim 1, wherein the trimesoyl chloride is unsubstituted.

11. The method of claim 1, wherein the nonpolar organic liquid comprises n-hexane.

12. The method of claim 1, wherein the first solution comprises the polar liquid co-solvent other than water present in an amount of greater than or equal to 0.100% w/v and less than or equal to 10% w/v.

13. The method of claim 1, wherein the second solution comprises the polar liquid co-solvent other than water present in an amount of greater than or equal to 0.100% w/v and less than or equal to 10% w/v.

14. The method of claim 1, wherein the polar liquid co-solvent is a polar aprotic liquid co-solvent.

15. The method of claim 1, wherein the polar liquid co-solvent comprises dimethylsulfoxide and/or acetone.

16. The method of claim 2, wherein the substrate comprises polyethersulfone and/or polysulfone.

17. The method of claim 2, wherein the substrate has a molecular weight cutoff of greater than or equal to 10 kDa and less than or equal to 100 kDa.

18. The method of claim 1, wherein the polymer layer has a molecular weight cutoff of greater than or equal to 50 Da.

19. The method of claim 1, wherein the polymer layer has a molecular weight cutoff of less than or equal to 400 Da.

20. The method of claim 1, wherein the porous medium has a rejection for NaCl of less than or equal to 30% at a temperature of 25° C. when measured using 2000 ppm of NaCl in deionized water with an operational trans-membrane pressure of 5 bar and a volumetric flow rate of 1.0 L min$^{-1}$ fed to the medium.

21. The method of claim 1, wherein the porous medium has a rejection for NaCl of less than or equal to 15% at a temperature of 25° C. when measured using 2000 ppm of NaCl in deionized water with an operational trans-membrane pressure of 5 bar and a volumetric flow rate of 1.0 L min$^{-1}$ fed to the medium.

22. The method of claim 1, wherein the porous medium has a water permeance of less than or equal to 10 L m$^{-2}$ h$^{-2}$ bar$^{-1}$ at a temperature of 25° C. when measured using 2000 ppm of NaCl in deionized water with an operational trans-membrane pressure of 5 bar and a volumetric flow rate of 1.0 L min$^{-1}$ fed to the medium.

23. The method of claim 1, wherein the porous medium has a rejection for NaCl of less than 25% and greater than 5% at a temperature of 25° C. when measured using 20% w/w of NaCl in deionized water with an operational trans-membrane pressure of 70 bar and a cross-flow velocity at at least one value in the range of 0.02 to 0.2 meters/second.

24. The method of claim 1, wherein the porous medium has a rejection for NaCl of less than 45% and greater than 10% at a temperature of 25° C. when measured using 15% w/w of NaCl in deionized water with an operational trans-membrane pressure of 70 bar and a cross-flow velocity at at least one value in the range of 0.02 to 0.2 meters/second.

25. The method of claim 1, wherein the porous medium has a rejection for NaCl of less than 90% and greater than 15% at a temperature of 25° C. when measured using 10% w/w of NaCl in deionized water with an operational trans-membrane pressure of 70 bar and a cross-flow velocity at at least one value in the range of 0.02 to 0.2 meters/second.

26. The method of claim 12, wherein:
the m-phenylenediamine is unsubstituted;
the unsubstituted m-phenylenediamine is present in the first solution in an amount of greater than or equal to 0.005% w/v and less than or equal to 0.015% w/v;
the trimesoyl chloride is unsubstituted;
the unsubstituted trimesoyl chloride is present in the second solution in an amount of greater than 0.004% w/v and less than or equal to 0.010% w/v;
the nonpolar organic liquid comprises n-hexane;
the polar liquid co-solvent other than water present in the first solution comprises a polar aprotic liquid;
the substrate has a molecular weight cutoff of greater than or equal to 10 kDa and less than or equal to 100 kDa;
the polymer layer has a molecular weight cutoff of greater than or equal to 50 Da and less than or equal to 400 Da;
following the exposing the substrate to the first solution, some or all of the first solution is removed from the substrate, resulting in the substrate being associated with the unsubstituted m-phenylenediamine, and the exposing the substrate to the second solution comprises exposing the substrate associated with unsubstituted m-phenylenediamine to the second solution;
the exposing the substrate to the first solution is performed for greater than or equal to 5 minutes and less than or equal to 15 minutes; and
the exposing the substrate to the second solution is performed for greater than or equal to 15 seconds and less than or equal to 5 minutes.

27. The method of claim 1, wherein at least 1 wt % of the optionally substituted m-phenylenediamine and at least 1 wt % of the optionally substituted trimesoyl chloride undergo the polymerization reaction to form the polymer layer.

28. The method of claim 4, wherein following the exposing the substrate to the first solution, at least 1 wt % of the first solution is removed from the substrate.

29. The method of claim 12, wherein the polar liquid co-solvent has a dielectric constant of greater than or equal to 6.

30. The method of claim 29, wherein the polar liquid co-solvent is a polar organic liquid.

31. The method of claim 30, wherein the polar liquid co-solvent is a polar aprotic liquid.

32. The method of claim 12, wherein the first solution comprises the polar liquid co-solvent in an amount of greater than or equal to 0.500% w/v and less than or equal to 5.00% w/v.

33. The method of claim 12, wherein the optionally substituted m-phenylenediamine is present in the first solution in an amount of greater than or equal to 0.008% w/v and less than or equal to 0.100% w/v.

34. The method of claim 33, wherein the optionally substituted trimesoyl chloride is present in the second solution in an amount of greater than or equal to 0.005% w/v and less than or equal to 0.050% w/v.

35. The method of claim 33, wherein the optionally substituted trimesoyl chloride is present in the second solution in an amount of greater than or equal to 0.010% w/v and less than or equal to 0.050% w/v.

* * * * *